United States Patent
Qiu et al.

(10) Patent No.: US 8,713,355 B2
(45) Date of Patent: *Apr. 29, 2014

(54) METHOD AND APPARATUS FOR MANAGING COMMUNICATION SERVICES FOR USER ENDPOINT DEVICES

(71) Applicant: AT&T Intellectual Property I, LP, Atlanta, GA (US)

(72) Inventors: Chaoxin Qiu, Austin, TX (US); Robert F. Dailey, Austin, TX (US); Satish Parolkar, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,851

(22) Filed: Jun. 7, 2013

(65) Prior Publication Data

US 2013/0272109 A1 Oct. 17, 2013

Related U.S. Application Data

(63) Continuation of application No. 13/542,192, filed on Jul. 5, 2012, now Pat. No. 8,484,504, which is a continuation of application No. 12/569,722, filed on Sep. 29, 2009, now Pat. No. 8,239,705.

(60) Provisional application No. 61/222,044, filed on Jun. 30, 2009.

(51) Int. Cl.
*G06F 11/00* (2006.01)

(52) U.S. Cl.
USPC ............... 714/4.2; 714/43; 709/227; 370/352

(58) Field of Classification Search
CPC ............ G06F 11/2005; G06F 11/2025; G06F 11/2028; G06F 11/2033; G06F 11/2038; H04L 41/0803; H04L 65/80; H04L 65/1006; H04L 69/40; H04M 3/12; H04M 15/8228
USPC ............ 714/4.1, 4.11, 4.2, 43, 48, 49, 51, 57; 709/227–229; 370/352–356
See application file for complete search history.

(56) References Cited

U.S. PATENT DOCUMENTS

| | | |
|---|---|---|
| 7,284,160 B2 | 10/2007 | Skog |
| 7,843,809 B2 | 11/2010 | Qiu |
| 2006/0250946 A1 | 11/2006 | Croak |

(Continued)

OTHER PUBLICATIONS

Handley, "RFC 2543—SIP: Session Initiation Protocol", http://www.faqs.org/rfcs/rfc2543.html; Sections 7.3, 7.3.2, 7.3.3, 7.5, and 7.5.4, Mar. 1999.

(Continued)

*Primary Examiner* — Scott Baderman
*Assistant Examiner* — Joseph Kudirka
(74) *Attorney, Agent, or Firm* — Guntin & Gust, PLC; Jay H. Anderson

(57) ABSTRACT

A system that incorporates teachings of the present disclosure may include, for example, an edge device having a controller to receive a Session Initiation Protocol (SIP) message from a user endpoint device (UE) requesting communication services, forward the SIP message to a network element of a Server Office, receive from the network element a first error message indicating communication services at the Server Office are unavailable, replace the first error message with a second error message, the second error message indicating a temporary unavailability of communication services, and transmit the second error message to the UE. Additional embodiments are disclosed.

20 Claims, 12 Drawing Sheets

(56) References Cited

U.S. PATENT DOCUMENTS

2007/0005712 A1    1/2007   Tiainen
2009/0268720 A1   10/2009   Veenstra
2010/0217875 A1    8/2010   Vergara
2010/0262704 A1   10/2010   Bakker

OTHER PUBLICATIONS

Sinnreich, "Internet Communications Using SIP: Delivering VoIP and Multimedia Services with Session Initiation Protocol (Second Edition)", Jul. 31, 2006; http://www.voiceip.com.ua/litiWiley.Internet.Communications.Using.SIP.Delivering.VoIP.and.Multimedia.Services.with.Session.Initiation.Protocol.Jul.2006.pdf; Ch1 0 p. 173-184.

Illustrative DNS SRV Assignments

West Region

; SRV records for subscribers designated to Dallas Server Office
; Assign higher priority 0 and larger weight 3 to ipbe in Dallas SO
    _sip._udp.sbcwest.att.net    SRV    0    3    5060    ims-core1.att.net
                                 SRV    1    0    5060    ims-core2.att.net ims-core1    A    142.30.79.10
    ims-core2    A    142.30.89.10

East Region

; SRV records for subscribers designated to Philadelphia Server Office
; Assign higher priority 0 and larger weight 3 to ipbe in Philadelphia SO
    _sip._udp.sbceast.att.net    SRV    0    3    5060    ims-core2.att.net
                                 SRV    1    0    5060    ims-core1.att.net ims-core1    A    142.30.79.10
    ims-core2    A    142.30.89.10

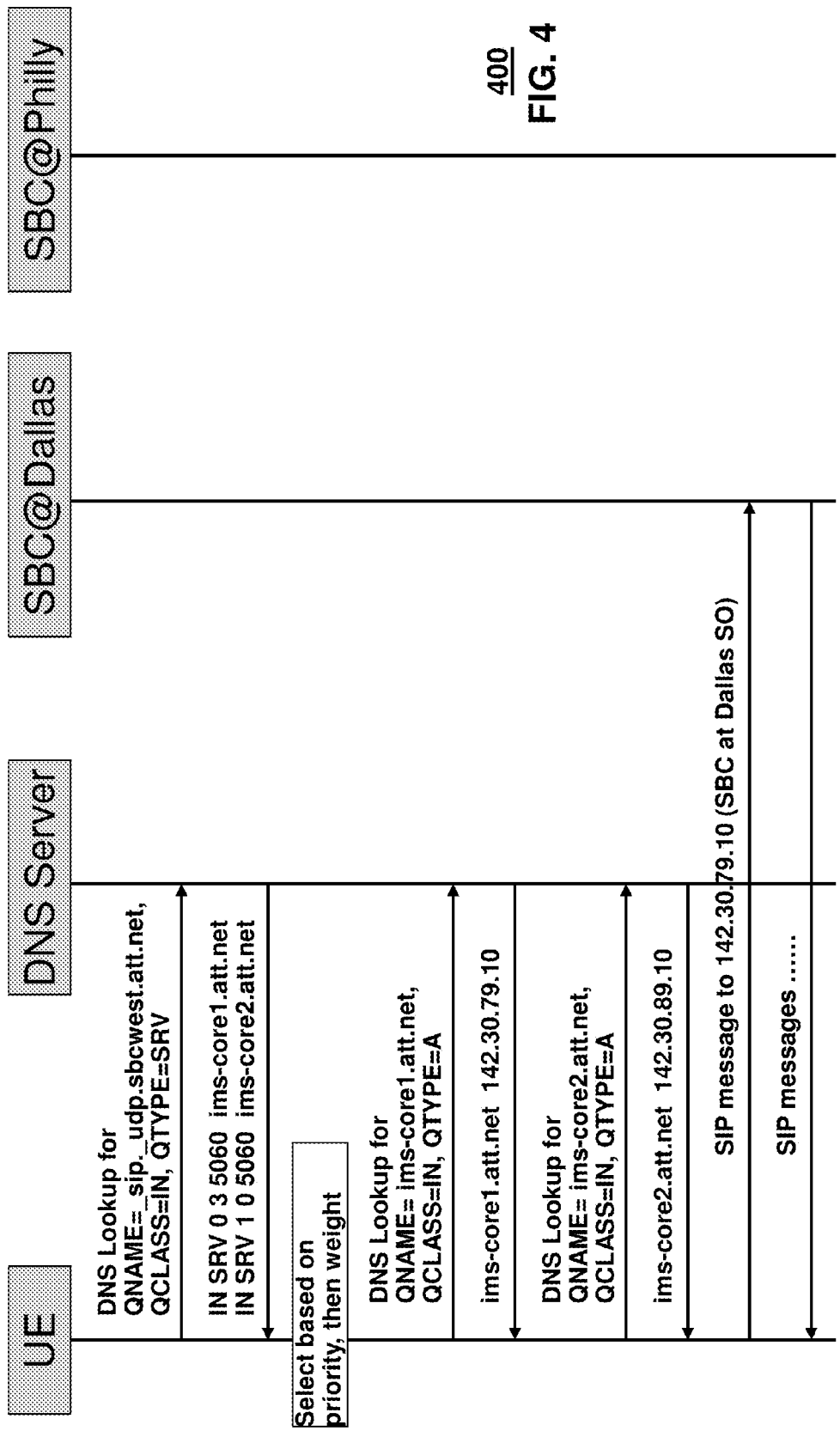

700

800

1000

METHOD AND APPARATUS FOR MANAGING COMMUNICATION SERVICES FOR USER ENDPOINT DEVICES

PRIOR APPLICATION

This application is a continuation of U.S. patent application Ser. No. 13/542,192 filed Jul. 5, 2012, which is a continuation of U.S. patent application Ser. No. 12/569,722 filed Sep. 29, 2009, which claims the benefit of priority to U.S. Provisional Application No. 61/222,044 filed on Jun. 30, 2009. All sections of the aforementioned applications are incorporated herein by reference in its entirety.

FIELD OF THE DISCLOSURE

The present disclosure relates generally to user endpoint device management, and more specifically to a method and apparatus for managing user endpoint devices in a communication network.

BACKGROUND

When a service provider of communications deploys a communications network, there can be many challenges. Among them include without limitation the cost of deployment, the cost of adding network equipment to accommodate subscriber growth, maintenance of the network, serviceability of the network, and managing the addition of new subscribers to the network—just to mention a few.

BRIEF DESCRIPTION OF THE DRAWINGS

FIG. 3 depicts an illustrative embodiment of provisioning information used by subscriber devices of the communication system of FIGS. 1-2;

FIGS. 4-5 depict illustrative embodiments of communication flow diagrams between the subscriber device and network elements of the communication system;

DETAILED DESCRIPTION

One embodiment of the present disclosure entails an edge device having a controller to receive a Session Initiation Protocol (SIP) message from a user endpoint device (UE) requesting communication services, forward the SIP message to a network element of a Server Office, receive from the network element a first error message indicating communication services at the Server Office are unavailable, replace the first error message with a second error message, the second error message indicating a temporary unavailability of communication services, and transmit the second error message to the UE.

One embodiment of the present disclosure entails a user endpoint device (UE) having a controller to transmit to an edge device a Session Initiation Protocol (SIP) message to request communication services, and receive from the edge device a second error message indicating a temporary unavailability of communication services, wherein the edge device transmitted the second error message to the UE in place of a first error message received from a Server Office indicating service is unavailable.

One embodiment of the present disclosure entails a computer-readable medium operating in an edge device having computer instructions to receive a Session Initiation Protocol (SIP) message from a user endpoint device (UE) requesting communication services, and replace a common error message generated by a Server Office when unavailable to provide communication services to the UE with an alternative error message indicating a temporary unavailability of communication services.

Figure 1:
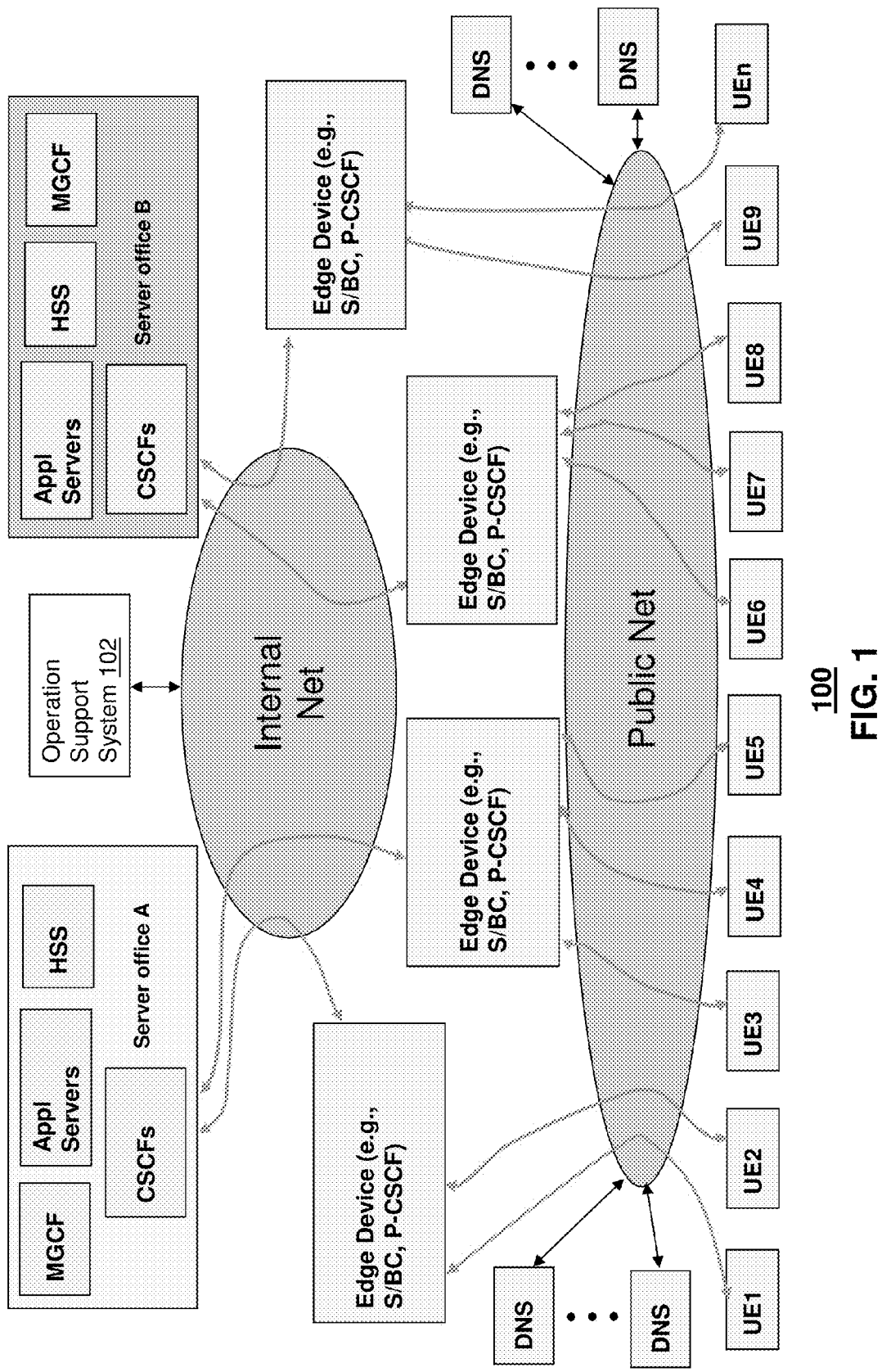
FIGS. 1-2 depict illustrative embodiments of a communication system.
Figure 2:
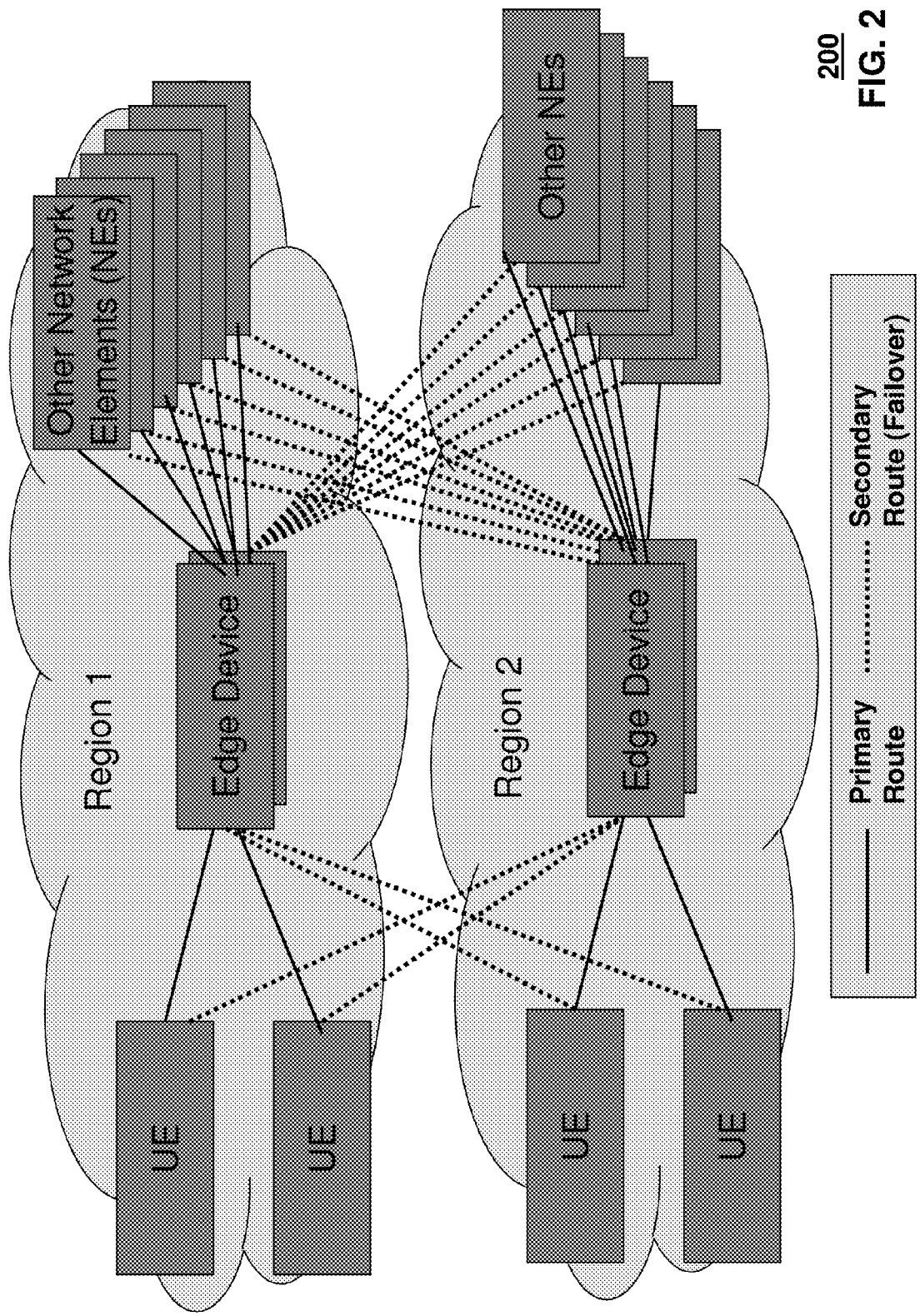

FIGS. 1-2 depict illustrative embodiments of a communication system. FIG. 1 depicts a Next Generation Network (NGN) comprising network elements that among other things can provide subscriber services such as Voice over Internet Protocol (VoIP), traditional Public Network Switched Network (PSTN), and a hybrid communications between VoIP and PSTN communication devices. NGN networks can have Access Offices which can communicate with subscriber devices in the form of user endpoint (UE) communication devices (herein referred to as UEs) over a Public Network of a service provider. The Public Network can be third party ISPs that provide Internet access to UEs in the last mile. The Access Offices can include among other things a Session Border Controller (S/BC) for interfacing with the UEs and thereby providing communication services thereto by way of a Proxy Call Session Control Function (P-CSCF) which communicates with a Server Office over an Internal Network of the service provider such as a Multi-Protocol Label Switching (MPLS) network. The MGW can be used to support hybrid communications between the UEs such as VoIP audio packets and PSTN TDM-based voice trunks.

The S/BC can submit communication requests initiated by the UEs to the Server Office via a P-CSCF. The Server Office in turn can manage such requests utilizing combinations of CSCFs, Application Servers, a Media Gateway Control Function (MGCF) which supports PSTN communications, and a Home Subscriber Server (HSS). The network elements of the Server Office singly or in combination provide resources to establish communications between UEs of a VoIP or PSTN type. The service provider of the communication network of FIG. 1 can provision the UEs by way of Domain Name Systems (DNS) servers which can be programmed by the service provider as desired.

The UEs are provisioned by the service provider with necessary information to connect to the NGN communication network of FIG. 1 and to obtain services therefrom. The UEs can request additional contact information of the service provider network from DNS servers on a periodic basis. The information can include information associated with a primary or secondary S/BC of one or more Access Office. As will be shown, the UE preferably registers with an Access Office with the primary S/BC. As shown in FIG. 2, the UE can register with the secondary S/BC as a means to mitigate a communication fault experienced by a network element of an Access Office or a Server Office which causes interruption in communication services provided to the UE.

FIG. 3 depicts an illustrative embodiment of provisioning information in the form of DNS Serve (SRV) records conforming to standards promulgated by the Internet Engineering Task Force (IETF). FIG. 3 illustrates a first logical Fully Qualified Domain Name (FQDN) associated with a West Region of the United States configured in such a manner that UEs in the West Region are primarily served by a Server Office located in Dallas. FIG. 3 further illustrates a second logical FQDN associated with an East Region of the United States configured in such a manner that UEs in the East Region are primarily served by a Server Office located in Philadelphia. Each logical FQDN can comprise primary and secondary SRV records for directing UEs to a primary or secondary S/BC, respectively, operating in a corresponding Access Office. For illustration purposes only, the first logical FQDN is represented by the character string_sip._udp.sbcwest.att.net, while the second logical FQDN is represented by the character string_sip._udp.sbceast.att.net. Any desirable character arrangement is possible for defining an FQDN.

A UE can be provisioned for example with a logical FQDN such as _sip._udp.sbcwest.att.net (or the other) shown in FIG. 3 by common means (e.g., at point of sale, over-the-air programming for wireless communication devices such as cellular phones, or by way of wireline provisioning). Once it is provisioned, a UE can query a DNS server for the SRV records associated with its logical FQDN according to the flow diagram of FIG. 4. As shown in the flow diagram, the DNS server can supply SRV records responsive to a query with the logical FQDN _sip._udp.sbcwest.att.net.

The priority of the first SRV record, designated by the field with the number "0", supersedes the priority of the second SRV record designated by the field with the number "1". Accordingly the A-record ims-core1.att.net supplied by the DNS server for the first SRV record corresponds to the primary S/BC, while the A-record ims-core2.att.net supplied by the DNS server for the second SRV record corresponds to the secondary S/BC. It should be noted that the primary and secondary S/BC's is determined by the priority field of the SRV records not the order of the SRV records shown in FIG. 3.

With the primary and secondary A-records, a UE assigned to the West Region FQDN (_sip._udp.sbcwest.att.net) can proceed to request the IP address of the primary S/BC (142.30.79.10) followed by the IP address of the secondary S/BC (142.30.89.10). Since the primary SRV record has a higher priority than the secondary SRV record, the UE chooses to register with the primary S/BC as shown in the illustration of FIG. 4, which in this example is situated in Dallas. If the UE is unable to register with the primary S/BC, it reverts to the secondary S/BC as depicted in the call flow diagram of FIG. 5.

It should be noted that the logical FQDN can be associated with any S/BC of any Access Office. Referring back to FIG. 3, the logical FQDN of the East Region (_sip._udp.sbceast.att.net) is programmed with a reverse order of the primary and secondary SRV records of the FQDN (_sip._udp.sbcwest.att.net) of the West Region. Thus a UE provisioned with the logical FQDN of the East Region shown in FIG. 3 will register with the primary S/BC situated in Philadelphia, and will rely on the secondary S/BC situated in Dallas for backup services. As such, UEs in the East region, provisioned with _sip._udp.sbceast.att.net, will use ims-core2.att.net since it has the priority 0, which is the higher priority.) The ability to associate the logical FQDN with any S/BC of any region or Access Office provides a service provider a means to manage the distribution and reallocation of UEs in an NGN network.

Figure 6:
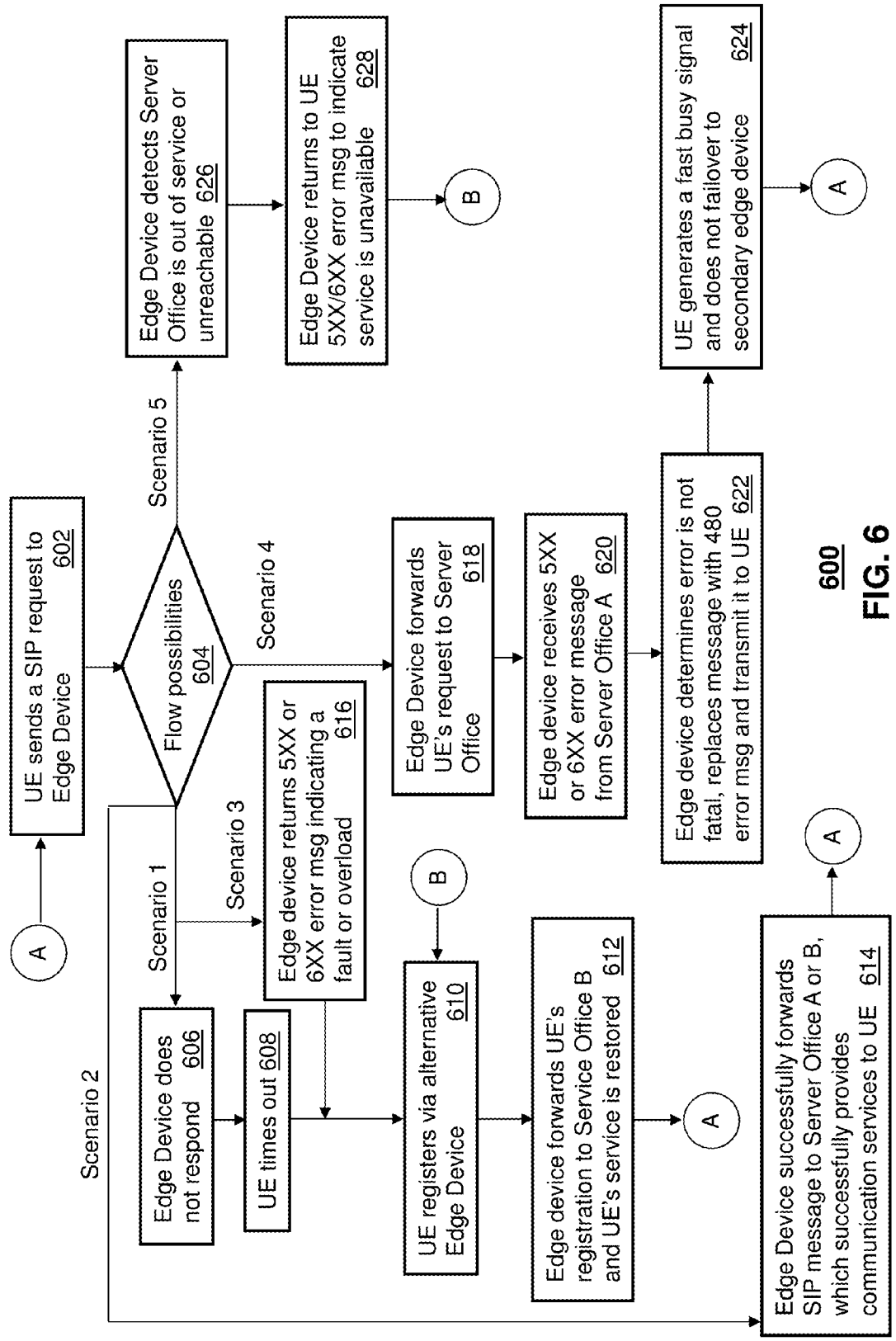
FIG. 6 depicts an illustrative method operating in portions of the communication system of FIGS. 1-2.

Method 600 of FIG. 6 depicts an illustrative embodiment for managing communication services of UEs in an NGN network. Method 600 can begin with step 602 in which a UE sends a SIP message to an Edge Device. The SIP message can represent a request to establish a communication session with another UE. In this step the UE submits the SIP message to whichever Edge Device it has registered with previously (e.g., a primary S/BC or a secondary S/BC). FIG. 6 presents five illustrative scenarios that can arise from step 604. Each scenario depicts how network elements of the NGN network and/or UE address communication requests under various conditions.

Method 600 of FIG. 6 depicts an illustrative embodiment for managing communication services of UEs in an NGN network. Method 600 can begin with step 602 in which a UE sends a SIP message to an Edge Device. The SIP message can represent a request to establish a communication session with another UE or a request to register with the primary S/BC. In this step the UE submits the SIP message to whichever Edge Device it has registered with previously (e.g., a primary S/BC or a secondary S/BC). FIG. 6 presents five illustrative scenarios that can arise from step 604. Each scenario depicts how network elements of the NGN network and/or UE address communication requests under various conditions.

Figure 7:
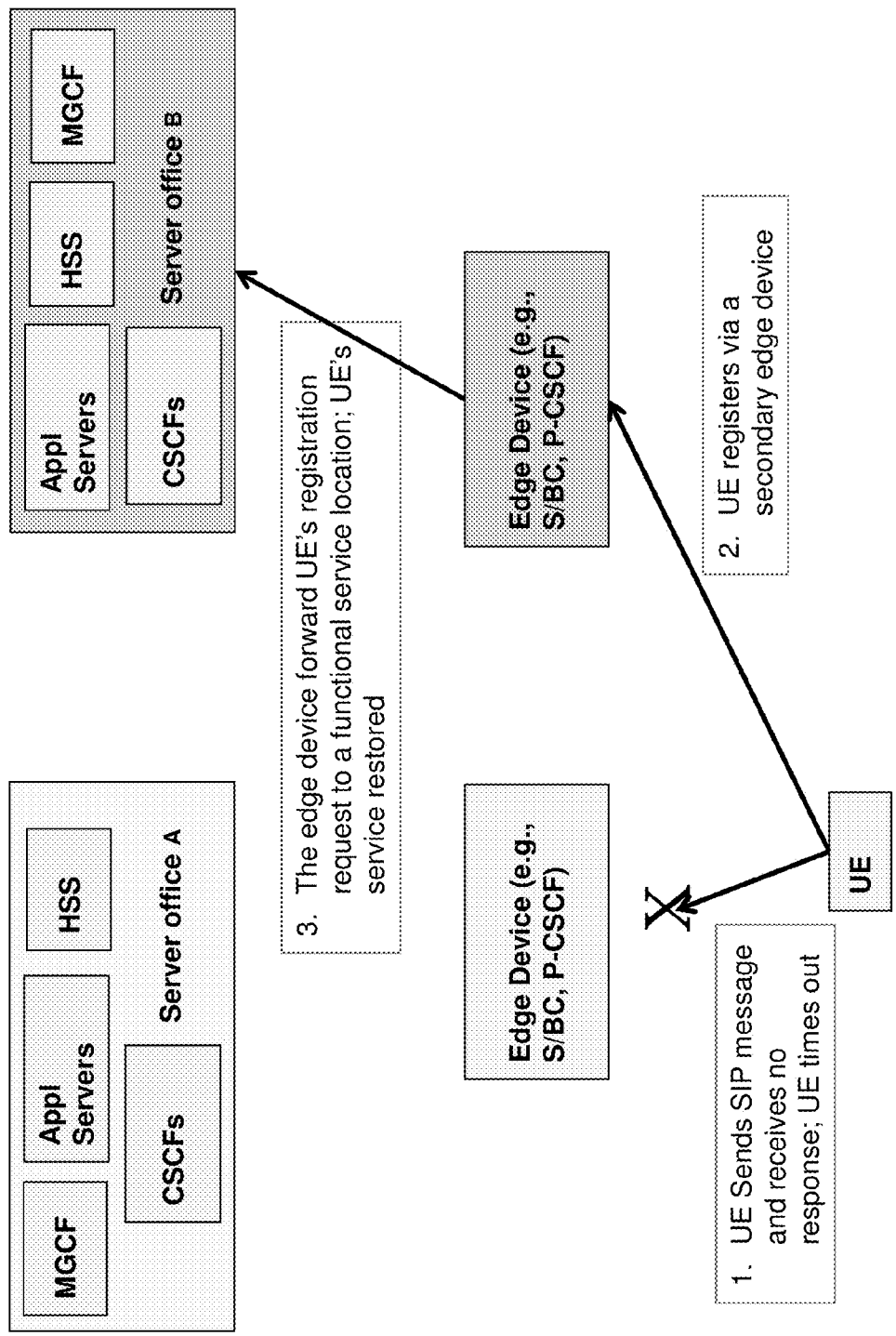
FIGS. 7-10 depict illustrative embodiments of communication flow diagrams between a UE and network elements of the communication system of FIGS. 1-2 according to the method of FIG. 8.

Beginning with scenario 1, the UE may encounter in step 606 a situation in which the Edge Device is non-responsive. Such a situation can arise from the S/BC malfunctioning, the P-CSCF malfunctioning, an IP transport network problem between the UE and the Edge device, or some other fault that would prevent the UE from communicating with the Edge Device. FIG. 7 depicts this scenario and the subsequent steps that may follow. Generally, the UEs can be programmed to monitor the response time of the Edge Device. If no response is received after a pre-defined timer (a timeout condition), the UE can proceed to steps 610-612 to register with an alternative Edge Device which (e.g., a secondary S/BC).

Figure 5:
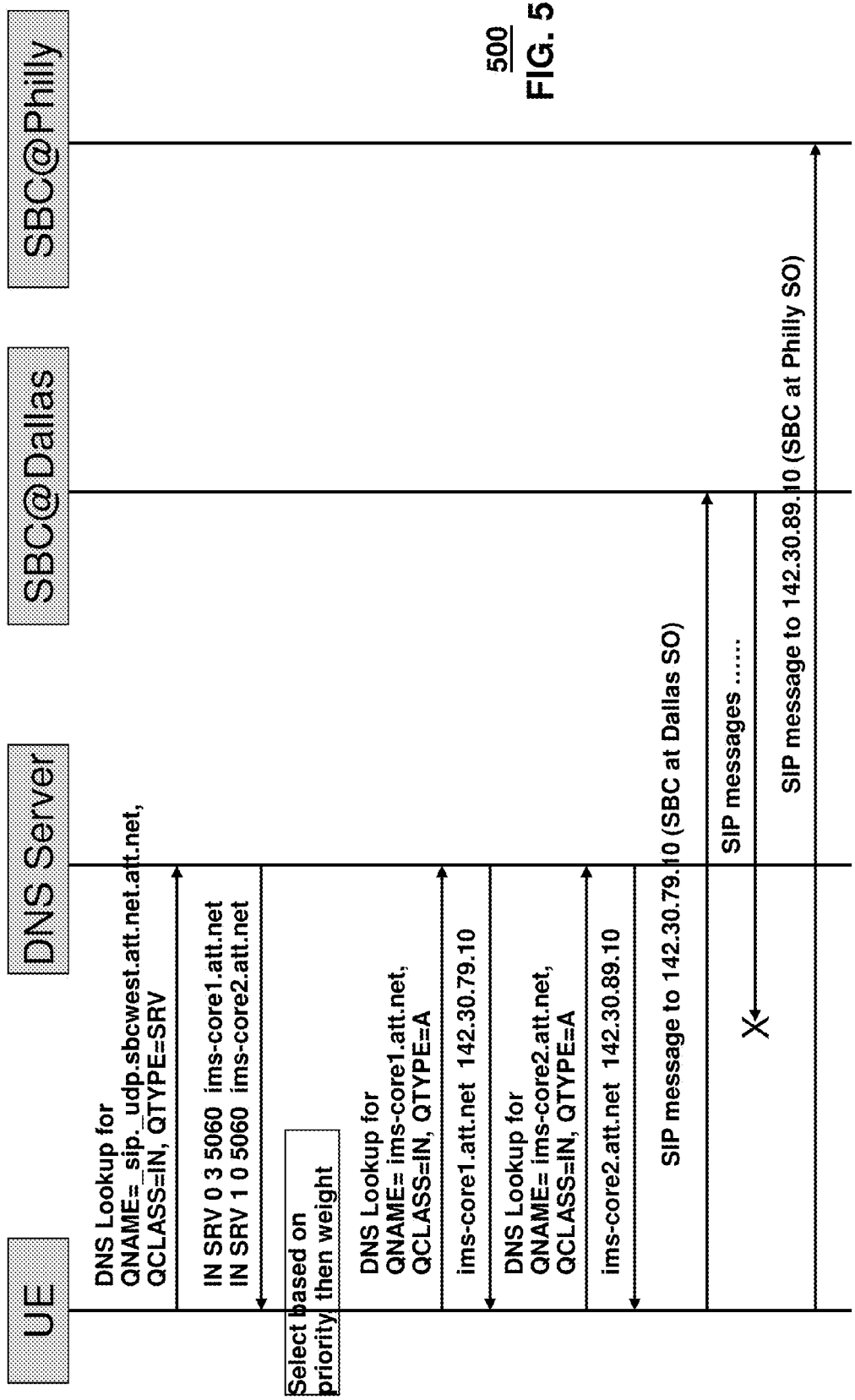

The failover registration process can occur as described in the call flow diagram of FIG. 5. Once service is restored, the UE can resubmit a SIP message at step 602 to attempt again to establish communications with a targeted UE. Scenario 2 represents a successful attempt by the UE to request communication services. If the alternative Edge Device successfully forwards the SIP message to a Server Office, and the Server Office is available, it can provide the UE in step 614 the communication services requested. As a result of step 614, the UE can establish communications with a targeted UE.

Figure 8:
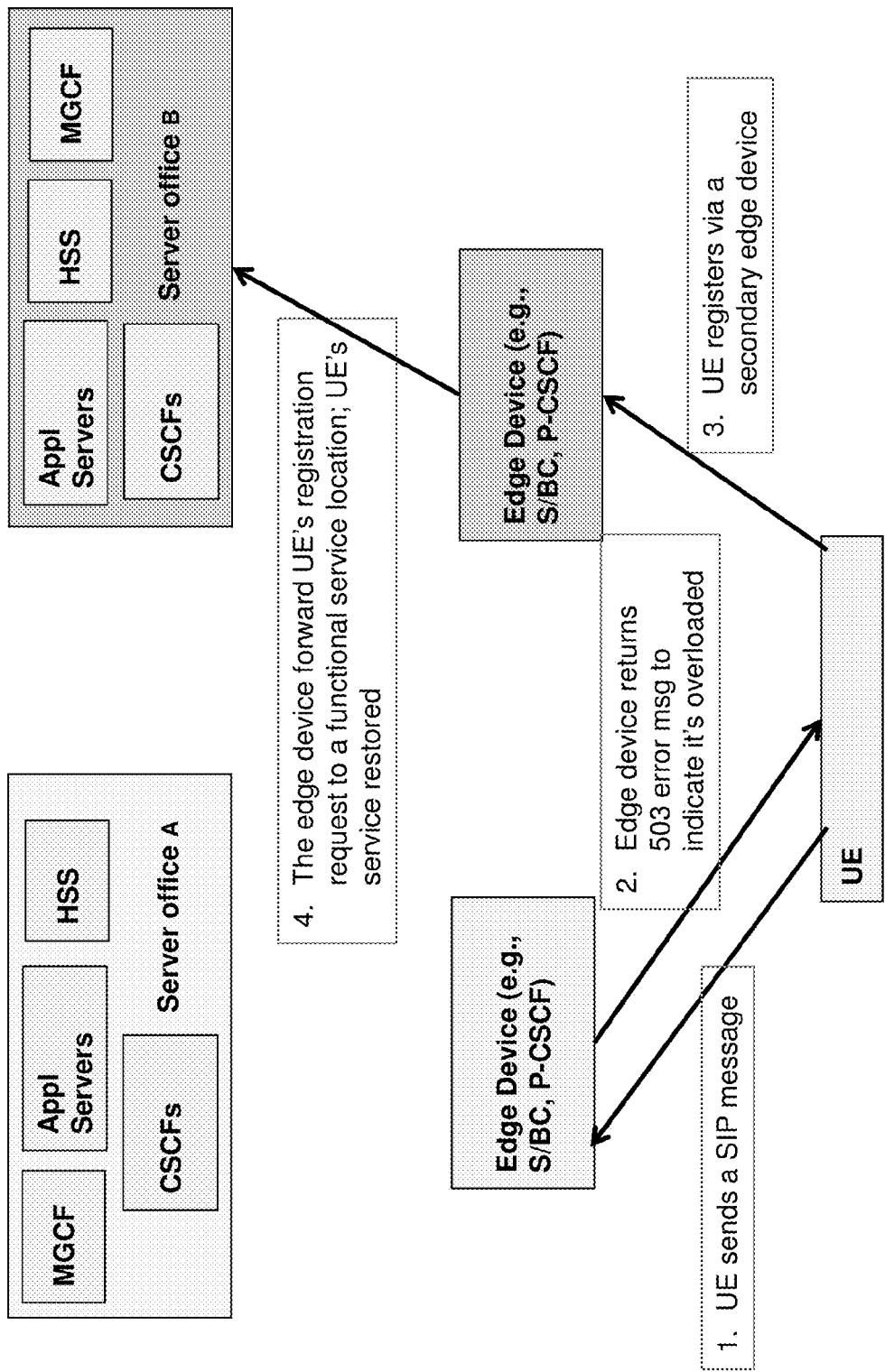

Scenario 3 depicts another scenario which may be encountered by the UE, which is illustrated in FIG. 8. Certain conditions such as a fault in computing or communication resources may prevent the Edge Device from processing the SIP message request submitted by the UE. In this situation, the Edge Device can transmit to the UE in step 616 an error message such as a SIP 503 code message which can represent a service unavailable condition as defined by IETF standards. Under these circumstances, the UE can resort to registering with an alternative Edge Device according to steps 610-612. Once service is available, the UE can submit another SIP message request in step 602 which may result in a successful communication session as a result of step 614.

Figure 9:
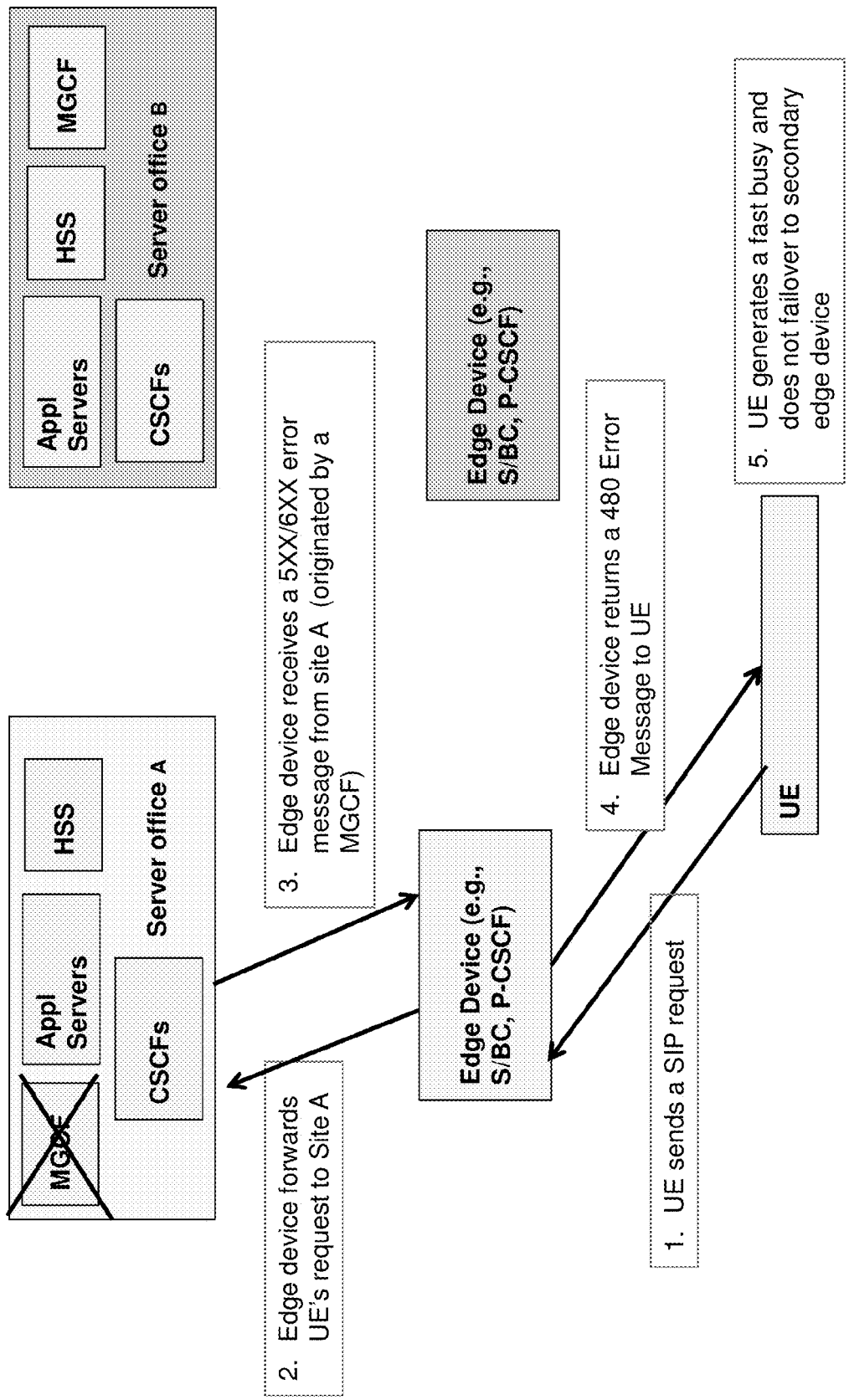

Scenario 4 depicts yet another scenario which may be encountered by the UE, illustrated in FIG. 9. In this illustration, the Edge Device in step 618 forwards the SIP message request to the Server Office, but receives in step 620 an error message from the Server Office in the form of a 5XX or 6XX SIP code indicating a condition in which a call processing server in the Server Office, e.g., MGCF, or S-CSCF, is unable to provide communication services to the UE due to due to server fault or resource overload. In step 622 the Edge Device however determines that the error is not a condition that would require the UE to fail over to another server office. That is, the responsible call processing server may be experiencing a fault condition which may be temporary.

To prevent the UE from resorting to registering with an alternative Edge Device as described by steps 610-612, the Edge Device in step 622 replaces the 5XX/6XX SIP code with a 480 SIP code. A 480 SIP code describes a communication state corresponding to a temporary unavailability of communication services. As a result of transmitting the 480 SIP code to the UE, the UE generates a fast busy signal, which does not invoke a failover procedure. The UE can be directed to resubmit another SIP message request in step 602 at a later time. On a subsequent attempt the Server Office may be available to provide the requested communication services.

It should be noted that prior art Edge Devices would have forwarded to the UE the error message generated by the Server Office. Had this happened, the UE would have registered with an alternative Edge Device as described by steps 610-612. By replacing the SIP error message of the Server Office in step 622, the Edge Device has likely prevented an unnecessary rehoming of the UE, which is an effective method for reducing false alarms submitted to UEs. The present method can make an NGN network more stable by preventing a large number of UEs from executing unnecessary geographical failover procedures.

Figure 10:
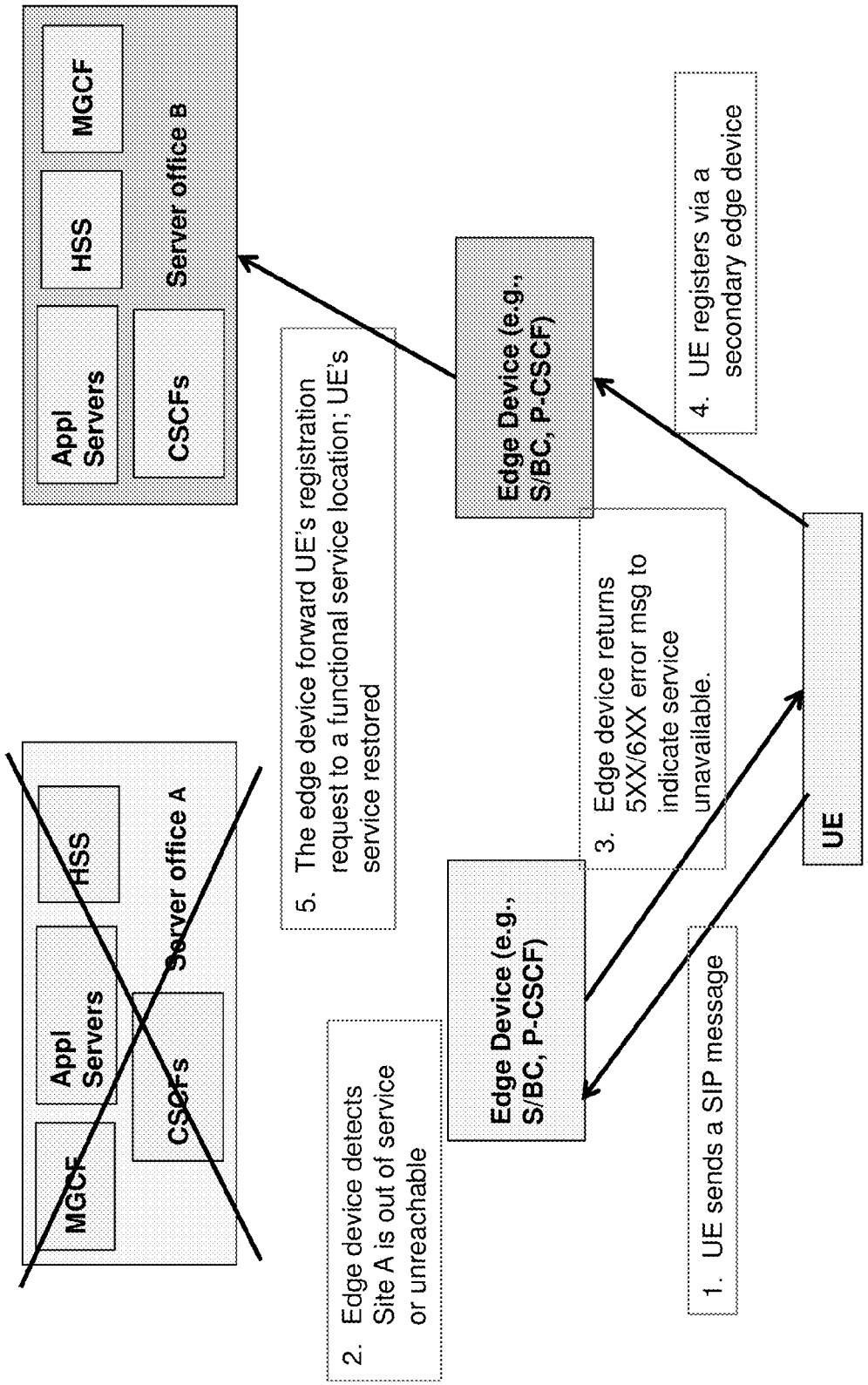

Scenario 5 depicts another scenario which may be encountered by the UE as shown by the illustration of FIG. 10. In this illustration, the Edge Device in step 626 detects that the Server Office is out of service or unreachable. The out of service condition can arise from faulty IP transport network connectivity between the Edge device and the server office, or a server office experiencing a power hit or natural disaster hit which prevents the edge device from communicating with the server office. Once detected, the Edge Device returns to the UE in step 628 a SIP error message in the form of a 5XX or 6XX SIP code to indicate service is unavailable. Under these circumstances, the UE resorts to registering to with an alternative Edge Device according to steps 610-612, and reattempts a request for communication services in step 602 as described earlier.

Figure 11:
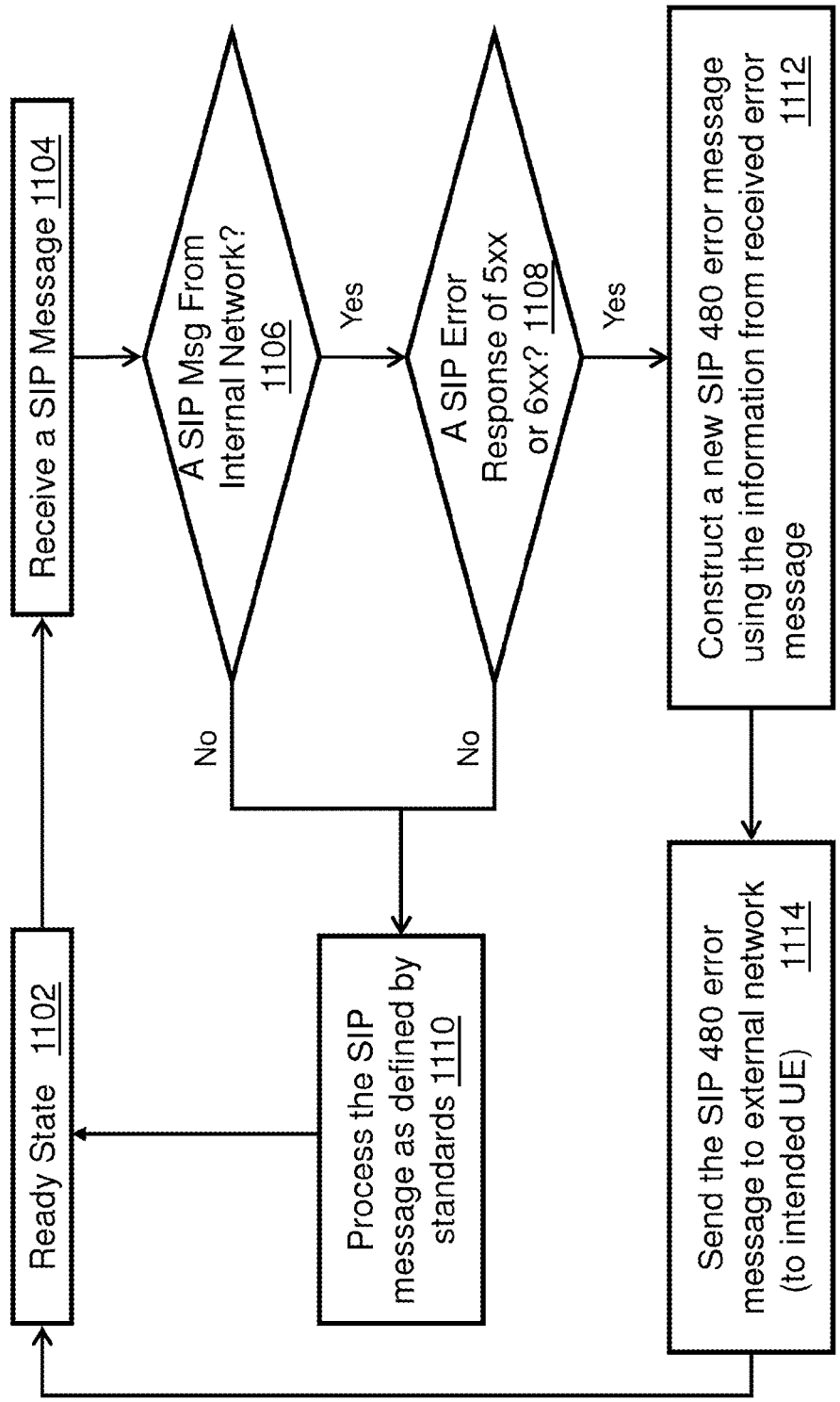
FIG. 11 depicts an illustrative method operating in the Edge Device of the communication system of FIGS. 1-2.

FIG. 11 depicts a generalization of a method 1100 operating in the Edge Device of FIGS. 1-2. Once the Edge Device is in a ready state in step 1102, it can process SIP messages received from UEs or from the internal server offices in step 1104. If Edge Device detects in step 1106 that the SIP message is not from a UE operating of the service provider network, or an error response has been received that is not a 5xx or 6xx SIP code, then the Edge Device proceeds to step 1110 where it process the SIP message as defined by the IETF standards. On the other hand, if the SIP message is from a service provider network's server office, and an error response has been received with a 5xx or 6xx SIP code, then the Edge Device proceeds to step 1112 where it constructs a new SIP 480 error message using the information in the received error message, and sends the SIP 480 error message to the requesting UE, thereby causing subsequent actions in the UE as described in FIG. 6.

From the foregoing descriptions, it would be evident to an artisan with ordinary skill in the art that the aforementioned embodiments can be modified, reduced, or enhanced without departing from the scope and spirit of the claims described below. Accordingly, the reader is directed to the claims for a fuller understanding of the breadth and scope of the present disclosure.

Figure 12:
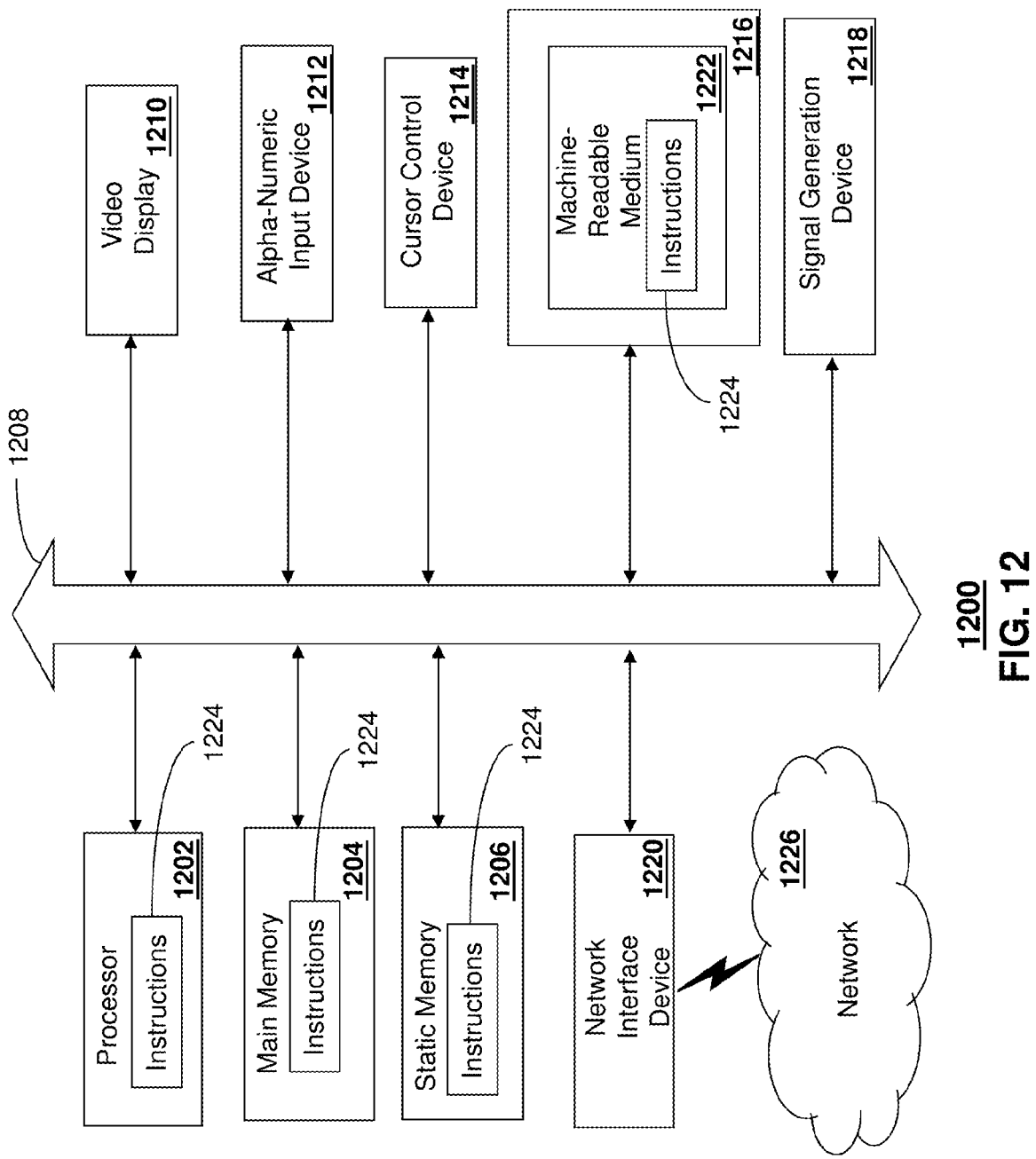
FIG. 12 depicts an illustrative diagrammatic representation of a machine in the form of a computer system within which a set of instructions, when executed, may cause the machine to perform any one or more of the methodologies disclosed herein.

FIG. 12 depicts an exemplary diagrammatic representation of a machine in the form of a computer system 1200 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU), or both), a main memory 1204 and a static memory 1206, which communicate with each other via a bus 1208. The computer system 1200 may further include a video display unit 1210 (e.g., a liquid crystal display (LCD), a flat panel, a solid state display, or a cathode ray tube (CRT)). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220.

The disk drive unit 1216 may include a machine-readable medium 1222 on which is stored one or more sets of instructions (e.g., software 1224) embodying any one or more of the methodologies or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1224, or that which receives and executes instructions 1224 from a propagated signal so that a device connected to a network environment 1226 can send or receive voice, video or data, and to communicate over the network 1226 using the instructions 1224. The instructions 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving, by a system comprising a processor, a session initiation protocol message from a user endpoint device requesting communication services, wherein the user endpoint device is communicatively coupled to a backup session border controller;
forwarding the session initiation protocol message to a network element of a primary server office;
receiving a first error message from the network element;
analyzing the first error message;
detecting a status of the primary server office, wherein the status is selected from the group consisting of a first error status and a second error status determined from the analyzing of the first error message;
replacing the first error message with a second error message and transmitting the second error message to the user endpoint device responsive to the status being the first error status, wherein the transmitting of the second error message to the user endpoint device prevents the user endpoint device from performing a failover registration to the backup session border controller; and
transmitting the first error message to the user endpoint device responsive to the status being the second error status, wherein the transmitting of the first error message to the user endpoint device causes the user endpoint device to perform the failover registration to the backup session border controller,
wherein the first error status indicates the primary server office is temporarily out of service, and
wherein the user endpoint device is a telephone.

2. The method of claim 1, wherein the forwarding of the session initiation protocol message, the receiving of the first error message, and the detecting of the status are performed by the system.

3. The method of claim 1, wherein the replacing of the first error message with the second error message and the transmitting of the second error message, and the transmitting of the first error message are performed by the system.

4. The method of claim 1, wherein the second error status indicates the primary server office is out of service.

5. The method of claim 1, wherein the first and second error messages correspond to first and second session initiation protocol error messages.

6. The method of claim 5, wherein the first session initiation protocol error message comprises a 5XX session initiation protocol code or a 6XX session initiation protocol code to indicate communication services are unavailable.

7. The method of claim 5, wherein the second session initiation protocol error message comprises a 480 session initiation protocol code to indicate communication services are temporarily unavailable.

8. The method of claim 1, wherein the user endpoint device generates a busy signal responsive to the transmitting of the second error message to the user endpoint device.

9. A method, comprising:
transmitting, by a system comprising a processor, a session initiation protocol message to a primary session border controller for requesting communication services for a user endpoint device;
receiving an error message from the primary session border controller;
analyzing the error message;
detecting a status, wherein the status is selected from the group consisting of a first error status and a second error status determined from the analyzing of the error message; and
disabling a failover registration by the user endpoint device to a backup session border controller by replacing the received error message with a replacement message that prevents the failover registration responsive to the status being the first error status,
wherein the first error status is associated with the communication services being temporarily out of service, and
wherein the system is the user endpoint device.

10. The method of claim 9, wherein the receiving of the error message, the analyzing of the error message, and the detecting of the status are performed by the system.

11. The method of claim 9, wherein the disabling of the failover registration is performed by the system.

12. The method of claim 9, wherein the second error status is associated with the communication services being out of service.

13. The method of claim 9, wherein the received error message comprises a session initiation protocol error message comprising a 480 session initiation protocol code to indicate communication services are temporarily unavailable.

14. The method of claim 9, comprising enabling the failover registration by the user endpoint device to the backup session border controller by transmitting the error message to the user endpoint device responsive to the status being the second error status.

15. The method of claim 9, wherein the error message comprises a session initiation protocol error message comprising a 5XX session initiation protocol code or a 6XX session initiation protocol code to indicate communication services are unavailable.

16. The method of claim 9, wherein the user endpoint device generates a busy signal responsive to receiving the replacement message.

17. A method, comprising:
receiving a session initiation protocol message from a user endpoint device requesting communication services;
forwarding the session initiation protocol message to a network element of a primary server office;
receiving an error message from the network element;
determining from the error message whether the primary server office is out of service; and
replacing the error message with a replacement message to prevent the user endpoint device from performing a failover registration to a backup session border controller responsive to determining that the primary server office is partially out of service,
wherein the receiving session initiation protocol message, the forwarding the session initiation protocol message, the receiving the error message, the determining from the error message whether the primary server office is out of service, and the replacing of the error message are performed by a primary session border controller, and
wherein the primary server office is out of service when the error message comprises a session initiation protocol error message comprising one of a 5XX session initiation protocol code and a 6XX session initiation protocol code.

18. The method of claim 17, wherein the replacement message comprises a second error message that causes the user endpoint device to assert a busy signal.

19. The method of claim 17, further comprising transmitting the error message to the user endpoint device to cause the user endpoint device to perform a failover registration to the backup session border controller responsive to determining that the primary server office is out of service.

20. The method of claim 17, wherein the primary server office is partially out of service when the error message comprises a 480 session initiation protocol code.

* * * * *